United States Patent
Seite

(10) Patent No.: US 9,160,547 B2
(45) Date of Patent: Oct. 13, 2015

(54) METHOD AND DEVICES FOR MANAGING A DATA FLOW TRANSFER

(75) Inventor: Pierrick Seite, Acigne (FR)

(73) Assignee: Orange, Paris (FR)

( * ) Notice: Subject to any disclaimer, the term of this patent is extended or adjusted under 35 U.S.C. 154(b) by 390 days.

(21) Appl. No.: 13/123,919

(22) PCT Filed: Oct. 13, 2009

(86) PCT No.: PCT/FR2009/051946
§ 371 (c)(1),
(2), (4) Date: Apr. 13, 2011

(87) PCT Pub. No.: WO2010/043810
PCT Pub. Date: Apr. 22, 2010

(65) Prior Publication Data
US 2011/0199955 A1    Aug. 18, 2011

(30) Foreign Application Priority Data
Oct. 15, 2008    (FR) ...................................... 08 56982

(51) Int. Cl.
*H04W 4/06* (2009.01)
*H04L 12/18* (2006.01)
*H04W 36/00* (2009.01)
*H04W 4/00* (2009.01)
*H04W 92/02* (2009.01)

(52) U.S. Cl.
CPC ............ *H04L 12/18* (2013.01); *H04W 36/0011* (2013.01); *H04W 4/06* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 2008/0132240 A1* | 6/2008 | Baek et al. | 455/442 |
| 2008/0181161 A1* | 7/2008 | Gi Kim et al. | 370/312 |
| 2008/0186913 A1* | 8/2008 | Ahn et al. | 370/329 |
| 2008/0192668 A1* | 8/2008 | Okubo et al. | 370/312 |
| 2009/0080363 A1* | 3/2009 | Song et al. | 370/312 |
| 2010/0165947 A1* | 7/2010 | Taniuchi et al. | 370/331 |

OTHER PUBLICATIONS

Kwon et al., "An efficient mobile multicast mechanism for fast handovers: A study from design and implementation in experimental networks," Computer Communications, Elsevier Science Publishers BV, Amsterdam, NL, vol. 31(10), pp. 2162-2177 (Jun. 25, 2008).
Miloucheva et al., "Multicast Context Transfer in mobile IPv6; draft-miloucheva-mldv2-mipv6-00.txt," IETF Standard-Working-Draft, Internet Engineering Task Force, IETF, CH, pp. 1-16 (Jun. 8, 2005).

* cited by examiner

*Primary Examiner* — Eunsook Choi
(74) *Attorney, Agent, or Firm* — Drinker Biddle & Reath LLP

(57) ABSTRACT

A method is provided for managing a transfer of a data stream received by a mobile terminal of a first network to a second network, the terminal having subscribed to at least one multicasting group receiving the data stream, and being connected to the first network by way of an access router for the first network, termed the first router. The method comprises: detecting, by an access router for the second network, termed the second router, an arrival of the terminal in the second network; obtaining, by the second router, information relating to at least one multicasting group to which the terminal has subscribed, on the basis of a reading of a subscription table; and receiving the data stream by the second router, on the basis of the information obtained, and retransmission to the terminal.

11 Claims, 2 Drawing Sheets

METHOD AND DEVICES FOR MANAGING A DATA FLOW TRANSFER

CROSS-REFERENCE TO RELATED APPLICATIONS

This application is the U.S. national phase of the International Patent Application No. PCT/FR2009/051946 filed Oct. 13, 2009, which claims the benefit of French Application No. 08 56982 filed Oct. 15, 2008, the entire content of which is incorporated herein by reference.

FIELD OF THE INVENTION

The field of the invention is that of digital communications.

More precisely, the invention relates to the transmission of digital streams destined for a terminal, and the switching from one access network to another when this terminal moves.

The invention is applied especially, but not exclusively, to the distribution of audiovisual streams using the IP ("Internet Protocol") protocol, also called IPTV, on portable terminals of telephone, computer type, personal assistant of PDA ("Personal Digital Assistant") type, etc.

BACKGROUND

The distributing of audiovisual programs to terminals is generally carried out in the form of data streams using the IP protocol.

These streams are multicast using a particular destination address, making it possible to dispatch an audiovisual program simultaneously to several recipients. Accordingly, these recipients must have subscribed to a group, called a multicasting group, designated by the particular destination address. One speaks of "multicast" broadcasting.

When a terminal subscribing to a multicast group is connected to a network by way of a router (also called an access point), this router is added to a multicasting tree for this group. In this way, the terminal can receive, by way of this router, the programs to which it has subscribed.

When the terminal changes network, it is necessary for the new network access router to be added to the multicasting tree for the multicasting group to which the terminal has subscribed. Indeed, if the user of the terminal (or the terminal loosely speaking) has subscribed to a service of "Orange TV" (trademark) type for example, this user must be able to receive this service on his terminal, whatever the network to which the terminal is connected.

This switchover or handover from a first network to a second network may give rise to a latency period, the time while the second network is added to the multicasting tree of the multicasting group considered. During this period, the terminal cannot receive the services to which it has subscribed, this not being acceptable.

The document "*An efficient mobile multicast mechanism for fast handovers: a study from design and implementation in experimental networks*" (D. H. Kwon at al., Computer communications, 2008) proposes a solution making it possible to reduce this latency period when switching from a first network to a second network.

According to this document, the terminal, which was previously connected to a first network by way of an access router PAR, detects a change of network. It then indicates to the access router PAR of the new network (second network) a list of its multicast subscriptions (multicasting groups to which the terminal has subscribed). On receiving this list, the access router NAR of the second network asks to be added to the multicasting trees of the multicasting groups to which the terminal has subscribed, and asks the access router PAR of the first network to make the corresponding multicast streams follow it.

The multicast streams are then transmitted from the access router PAR of the first network to the terminal, by way of the access router NAR of the second network.

Once the process of subscription of the access router NAR of the second network has terminated, that is to say once the access router PAR of the second network has been added to the multicasting trees of the groups to which the terminal has subscribed, the terminal asks the access router PAR of the first network to stop transferring the multicast streams.

A drawback of this technique is that the terminal must be able to communicate at one and the same time with the router of the former network to which it was connected and with the router of the new network.

Indeed, the terminal must take the initiative to ask the router of the new network (second router) to make the multicast streams to which it has subscribed follow it, by indicating to this second router the multicasting group to which it has subscribed.

Moreover, the terminal must ask the router of the former network (first router) to stop making the multicast streams follow it by way of the second router.

Now, the terminal is not always able to communicate with both networks at one and see same time, especially when the link with the first router is lost following a physical movement of the terminal.

Moreover, this solution is not compatible with the new document RFC 5213 describing a new protocol "Proxy Mobile Internet Protocol version 6" (PMIPv6), specified in August 2008 by the IETF ("Internet Engineering Task Force"), the terminal being active in the handover process. Indeed, one of the constraints imposed in this document is that the handover process is entirely transparent to the terminal (one speaks of "seamless mobility").

SUMMARY

The invention proposes a new solution which does not exhibit all these drawbacks of the prior art, in the form of a method for managing a transfer of a data stream received by a mobile terminal from a first network to a second network. It is considered that the terminal is connected to the first network by way of an access router for the first network, termed the first router, and has subscribed to at least one multicasting group receiving the data stream.

According to the invention, such a method implements the following steps:

detection, by an access router for the second network, termed the second router, of an arrival or presence of the terminal in the second network;

obtaining, by the second router, of information relating to at least one multicasting group to which the terminal has subscribed, on the basis of a reading of a subscription table;

reception of the data stream by the second router, on the basis of the information obtained, and retransmission to the terminal.

The invention thus proposes a new and inventive solution for managing a handover between various access networks, belonging especially to one and the same operator. For example, these networks are third-generation cellular networks (of GSM or UMTS type for example), networks with radio access points of WiFi type, domestic networks, etc.

More precisely, the term "network" is understood to mean a logical group of nodes connected together. In networks of IP type especially, the various nodes of one and the same network share a common network mask (in IPv4) or a network prefix (in IPv6).

Thus, handover between various access networks is understood equally well as:
- the switch from a first access point to a second access point, within one and the same network (GSM network for example); or
- the switch from a network using a first technology (WiFi network inside a building for example) to another network using this same technology (WiFi network inside another building for example); or
    - the switch from a network using a first technology (GSM network for example) to a network using a second technology, distinct from the first technology (WiFi network for example).

Indeed, according to the proposed solution, the terminal has no specific action to perform when it switches from one network to another, i.e. when it changes access or attachment point (router). The change of network is therefore transparent to the terminal. The proposed solution is therefore compatible with the protocol "Proxy Mobile Internet Protocol version 6".

More precisely, it is the second router i.e. the new access point, which detects the arrival or the presence of the terminal in its coverage zone. On account of the presence of a subscription table, the terminal does not have, according to the invention, to transmit to the second router the list of its subscriptions.

It is noted that this subscription table may be read by various entities. It may be read by the second router itself, or by the first router which thereafter transmits the useful information to the second router, or else by a router common to the two networks. Such a table indicates, for the terminal at least, one or more multicasting group to which it has subscribed. It thus establishes a relation between a terminal and its multicasting group. It may be updated periodically and/or as a function of a modification of the subscriptions of the terminal. It is thus possible to indicate in real time the multicasting group(s) to which a terminal has subscribed.

In this way, as soon as the second router detects the presence of the terminal in the second network, it can obtain information relating to the multicasting group(s) to which the terminal has subscribed, and begin the handover procedure, without waiting to receive instructions on the part of the terminal.

According to a particular aspect, the management method comprises a step of adding the second router to a multicasting tree for the multicasting group receiving said data stream. The reception step is then implemented as long as the second router does not belong to the multicasting tree.

Stated otherwise, the second router receives the data stream from another entity (first router, common router) and transfers it to the terminal, as long as the subscription process for the second router has not terminated, that is to say as long as the second router has not been added to the multicasting tree of the multicasting group receiving the stream to which the terminal has subscribed. Once this subscription process has terminated, the second router can continue the transmission of the stream to the terminal, without having to receive this stream from another entity.

Once again, the terminal does not have to intervene in order that the first router should stop transferring the multicast streams to it by way of the second router. It is the end of the subscription procedure for the second router which triggers the stopping of this retransmission.

These operations are therefore transparent to the terminal.

They also deal with the latency problem, since the terminal receives the stream without interruption, whether it originates directly from the second router after the subscription procedure or from another entity.

According to a first embodiment, the subscription table indicates, for a terminal, all the multicasting group to which the terminal has subscribed, and the reading is implemented by the second router.

According to this first embodiment, a single subscription table is considered, which may be read by any entity of the first or second network.

This subscription table is updated periodically and/or as a function of a modification of the subscriptions of the terminal, by the access router to which the terminal is connected.

In this way, the second router can very rapidly obtain information relating to the multicasting group(s) to which the terminal has subscribed, by directly reading this subscription table.

In particular, according to this first embodiment, the second router sends a request to transmit the data stream destined for a router common to the first and second networks, and receives the data stream originating from the common router.

Thus, once this information has been obtained, the second router asks the common router to transfer to it the multicast streams that it does not receive (i.e. for which it has not yet subscribed).

In this way, the terminal receives without interruption the multicast streams to which it has subscribed, even upon a change of network. The latency problems are therefore solved, and the change of network is invisible to the terminal.

For example, the common router is a mobility anchor, also called an LMA for "Local Mobile Anchor", according to the PMIPv6 terminology. By definition, such a mobility anchor knows, at each instant, the location of the mobile terminals in the various networks, and reroutes the traffic which is intended for them as a function of this location.

A multicast module for example is added to the mobility anchor, making it possible, during mobility of a terminal, to make the multicast streams follow the terminal temporarily.

According to a second embodiment, the subscription table is associated with the first router and indicates, for a terminal connected to the first network, all the multicasting group to which the terminal has subscribed. In this case, the reading is implemented by the first router.

Stated otherwise, the first router keeps up to date its own table of multicast subscriptions for the terminals which are connected to it. As the terminal was previously connected to the first network, the first router knows the multicasting group(s) to which the terminal has subscribed.

The second router therefore interrogates the first router to ascertain the multicasting group(s) to which the terminal which is now connected to the second network has subscribed.

In particular, according to this second embodiment, the second router sends a request to transmit the data stream destined for the first router and receives the data stream originating from the first router.

A jam at the level of the common router is thus avoided, since the multicast streams are temporarily transmitted from the first router to the second router, for the time until the latter's subscription process terminates.

In particular, a second subscription table may be associated with the second router, this second subscription table indicating, for a terminal connected to the second network, all the multicasting group to which the terminal has subscribed.

Thus, each router keeps its own subscription table up to date, indicating the multicast subscriptions for the terminals which are connected to it. Again, this allows fast transfer of the data stream in the case of handover.

In another embodiment, the invention relates to a computer program comprising program code instructions for the implementation of the management method described above, when it is executed by a processor. For example, such a program is downloadable from a communication network and/or stored on a medium readable by computer and/or executable by a processor.

Another aspect of the invention relates to a system for managing a transfer of a data stream received by a mobile terminal of a first network to a second network,
the system comprising:
an access router for the first network, termed the first router;
an access router for the second network, termed the second router;
the terminal having subscribed to at least one multicasting group receiving said data stream, and being connected to the first network by way of the first router.

According to the invention, the second router comprises:
means for detecting an arrival of the terminal in the second network;
means for obtaining information relating to at least one multicasting group to which the terminal has subscribed, on the basis of a reading of a subscription table; and
means for receiving the data stream on the basis of the information obtained, and for retransmission to the terminal.

Such a system is especially suitable for implementing the management method described above.

In particular, such a system also comprises a router common to the first and to the second network. For example, the common router of the multicast multicasting network is a mobility anchor ("Local Mobility Anchor" or LMA), and the first and second routers are mobile access gateways (MAGs).

One or more entities of the system (for example the first and/or the second router) also comprise means for reading the subscription table (or tables).

The invention also relates to an access router for a second network, able to receive a data stream transferred from a first network,
a terminal having subscribed to at least one multicasting group receiving the data stream, and being connected to the first network by way of an access router for the first network, termed the first router.

According to the invention, the access router for the second network comprises:
means for detecting an arrival of the terminal in the second network;
means for obtaining information relating to at least one multicasting group to which the terminal has subscribed, on the basis of a reading of a subscription table; and
means for receiving the data stream on the basis of the information obtained and for retransmission to the terminal.

Such a router belongs for example to a system such as described above. It is for example a mobile access gateway.

BRIEF DESCRIPTION OF THE DRAWINGS

Other characteristics and advantages of the invention will be more clearly apparent on reading the following description of a particular embodiment, given by way of simple illustrative and no limiting example, and the appended drawings, among which.

DETAILED DESCRIPTION

The general principle of the invention relies on the use of a subscription table making it possible, by virtue of the information that it contains, to ensure the reception of so-called "multicast" data streams by a terminal in the case of mobility of this terminal, and especially of a change of network. Such multicast streams are multicast to at least one multicasting group to which the terminal has subscribed. It is recalled that the term "network", especially of IP type, is understood to mean a set of nodes in one and the same homogeneous IP addressing space.

More precisely, such a subscription table associates, with one terminal at least, one or more multicasting group(s) to which the terminal has subscribed. Thus, such a subscription table comprises, for one or more terminals:
the identifier of the terminal and/or of the user;
one or more destination addresses linked with this identifier, designating the multicasting group(s) to which the terminal or the user has subscribed.

Figure 1:
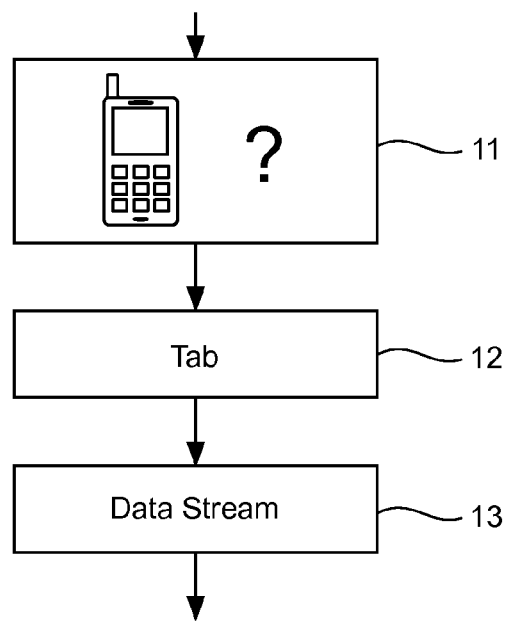
FIG. 1 presents the main steps of the method for managing a transfer of a data stream according to an embodiment of the invention.

The main steps of the method for managing a transfer of a data stream according to an embodiment of the invention are presented hereinafter, in conjunction with FIG. 1. It is noted that such a method may be implemented in various ways, especially in hard-wired form or in software form.

We consider a mobile terminal from a first network to a second network, that is to say, for example, from a first access point (first router) to a second access point (second router), within one and the same WiFi network.

This terminal is connected to the first network by way of an access router for the first network, termed the first router, and has subscribed to at least one multicasting group receiving the data stream. Initially, the terminal therefore receives the data stream (multicast stream) by way of the first router.

In the case of mobility of the terminal from the first network to a second network, the access router for the second network, termed the second router, detects in the course of a detection step 11 the arrival (or the presence) of the terminal in the second network. This detection intervenes when the terminal attaches, in a conventional manner, to the second router. For example, this detection intervenes when the access router receives an authentication request sent by the terminal (comprising the identifier of the terminal and optionally the proof of its identity (certificate, key, password, etc.)).

Thus, the terminal itself does not have to signal a change of network.

In order to ensure the reception of the data stream when the terminal is connected to the second network, a subscription table Tab is read by an entity of the first or of the second network. The second router can then obtain, in the course of an obtaining step 12, information relating to at least one multicasting group to which the terminal has subscribed.

In particular, the second router can obtain information relating to the multicasting group which makes it possible to receive the data stream. In this way, the second router can receive the data stream in the course of a following reception step 13, and retransmit it to the terminal.

During the change of network, the terminal therefore still receives the multicast data stream, and does not have to accomplish any specific action for the subscription of the second router. The management of the mobility of the terminal does not therefore rely on the terminal.

Thus, the proposed solution is compatible with the PMIPv6 protocol specified in August 2008 by the IETF.

It is also noted that if the multicast stream corresponds to a paying service (for example "Orange Sports"-trademark), an additional check step is necessary, so as to authorize the multicasting of the multicast stream to the subscriber users only. Moreover, these subscriber users must be able to receive this multicast stream, whatever terminal they are using.

In this case, the subscription table can comprise the identifier of the user, and one or more destination addresses linked with this identifier.

Two embodiments of the invention, implemented in the field of digital television over IP services (IPTV) for example, are described hereinafter in conjunction with FIGS. 2 and 3.

We consider for example a system implementing a PMIP architecture according to which an access router 14 for a multicast multicasting network, also denoted LMA, acts as mobility anchor.

This LMA router 14 is common to several networks. Stated otherwise, this LMA router 14 communicates with an access router 15 for a first network, termed the first router or mobile access gateway MAG1, and with an access router 16 for a second network, termed the second router or mobile access gateway MAG2. These first and second networks correspond for example to two access points within one and the same WiFi network, or to two distinct WiFi local networks, or to a cellular network of UMTS type and a WiFi network. The LMA router 14 also communicates with a multicast source or opposite party 17.

The LMA router 14 ascertains at each instant the location of the terminals in the multicast multicasting network and reroutes as a function of this location the traffic which is intended for these terminals. According to the PMIP process, the location of a terminal is indicated to the LMA router 14 by the access router (MAG1 15 or MAG2 16) to which the terminal connects.

In the case of multicast stream transport, the IP mobility of the terminal from the first network to the second network requires that the new access point (second router MAG2 16) join the multicast multicasting tree, if it is assumed that the multicast streams are not already multicast on the second router MAG2 16.

A first embodiment is described hereinafter, illustrated in FIG. 2, according to which a subscription table Tab 18 and a multicast module 19 are added to the conventional PMIP architecture.

The subscription table 18 may be associated with any entity of the first or of the second network. For example, it is associated with the LMA common router 14. It may be read by the first router MAG1 15 and by the second router MAG2 16.

According to this first embodiment, this subscription table is unique, and knows all the multicasting group to which a terminal has subscribed. For example, this subscription table is managed by an operator, such as Orange (trademark), that updates this table periodically, or each time that a terminal modifies its subscriptions (new subscription or unsubscription). According to a particular embodiment, this subscription table makes it possible to associate with each terminal present in the multicast multicasting network, the set of multicasting group to which it is connected.

The multicast module 19 is for its part associated with the LMA common router 14. This module makes it possible, during mobility of a terminal, to make the multicast streams follow this terminal temporarily.

According to this first embodiment, when a terminal passes from the first network to the second network, it is possible to make the multicast streams travel from the LMA common router 14 to the second router MAG2 16 for the time that the second router MAG2 16 resubscribes, in place of the terminal, to the desired multicasting group, and thus that the second router MAG2 16 joins the multicasting tree for the multicasting group of this terminal.

Accordingly, the second router MAG2 16 consults the subscription table 18, which allows it to ascertain the multicasting group to which the terminal has subscribed.

Figure 2:
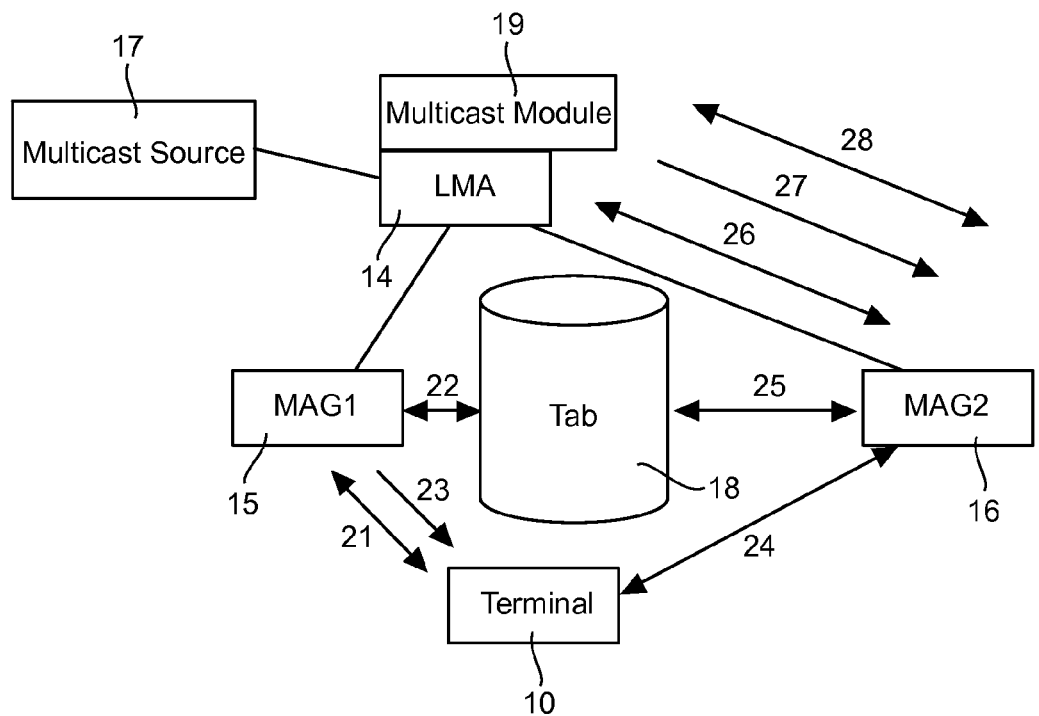
FIG. 2 illustrates a first embodiment of the invention in a system implementing a PMIP architecture.

The main steps implemented according to this first embodiment are described more precisely in conjunction with FIG. 2.

It is considered for example that the terminal 10 is connected to the first network by way of the first access router MAG1 15.

In the course of a step 21, the terminal 10 subscribes to a new multicasting group (multicast group), for example to the group "Orange Sports" (trademark).

In the course of a following step 22, the first access router MAG1 15, which receives the request for subscription to the group "Orange Sports" (trademark), updates the subscription table 13 for the terminal 10.

In the course of a following step 23, in accordance with the conventional multicast IP mechanisms, the first access router MAG1 15 joins the multicast multicasting tree for this group and transfers the corresponding multicast stream onto the terminal's link.

In the course of a step 24, the terminal performs a mobility. Stated otherwise, it attaches to a new access point, termed the second router MAG2 16, in a conventional manner (conventional IP attachment). This new access point can make it possible to access a network of the same type as the first network (WLAN wireless local area network for example) upon a change of location of the terminal 10.

In the course of a following step 25, the second router MAG2 16 will read from the subscription table 18 the multicasting group to which the terminal 10 has subscribed. It thus learns that the terminal 10 has subscribed to the group "Orange Sports" (trademark).

In the course of a following step 26, the second router MAG2 16 notifies the LMA common router 14 of the attachment of the terminal to this router MAG2 (according to a conventional PMIP process), and asks the LMA common router 14 to make the multicast streams that it does not receive follow it.

In parallel, the second router MAG2 16 initiates the update of the multicast routing for these multicast streams. Stated otherwise, the second access router MAG2 16 commences the subscription process to join the multicast multicasting tree.

In the course of a following step 27, the LMA common router 14 makes the requested multicast streams follow the second router MAG2 16. It is noted that, according to this first embodiment, the LMA common router 14 must itself have subscribed to all the multicasting group liable to be requested by each of the terminals present in the multicast multicasting network.

When the second router MAG2 16 has finally joined the multicast multicasting tree, the multicast routing is updated, in the course of a following step 28. The second access router MAG2 16 therefore asks the LMA common router 14 to stop the transfer of data.

Stated otherwise, during the procedure of transfer from the first network to the second network, the second router MAG2 16 receives a football match multicast to the subscribers of the service "Orange Sports" (trademark) of the LMA common router 14, as long as the second router MAG2 16 does not belong to the multicasting tree associated with this service. Once the subscription procedure for the second router MAG2 16 has been completed, that is to say once the second router MAG2 16 belongs to the multicasting tree associated with this service, the stream no longer travels through the LMA common router 14.

Thus, in accordance with the PMIP specification, the terminal is not involved in the mobility management mechanism. Moreover, by virtue of the use of a subscription table, the multicast stream travels from the LMA common router 14 to the second router MAG2 16, for the time that the second router MAG2 16 joins the multicasting tree, thereby making it possible to avoid the latency problems encountered according to the prior art techniques.

A second embodiment, illustrated in FIG. 3, according to which several subscription tables are added to the conventional PMIP architecture is described hereinafter.

For example, a subscription table is associated with each access router:

a first subscription table Tab1 181 is associated with the first router MAG1 15;

a second subscription table Tab2 182 is associated with the second router MAG2 16.

According to this second embodiment, the subscription table associated with a router indicates, for the terminal or terminals connected to the corresponding network, the multicasting group or group to which they have subscribed. For example, these tables are updated individually, and periodically or each time that a terminal modifies its subscriptions (new subscription or unsubscription) within the corresponding network. Thus, each access router (MAG1 15 and MAG2 16) keeps up to date its own subscription table for the terminals which are connected to it. According to a particular embodiment, the subscription table associated with an access router contains as many entries as terminals that are attached to the access router, each entry of the subscription table comprising the list of subscriptions for the terminal corresponding to this entry. Stated otherwise, each access router manages the multicast subscriptions for the terminals which are attached to it.

The invention thus proposes, according to this second embodiment, that a subscription table be distributed in each access router.

According to this second embodiment, when a terminal passes from the first network to the second network, it is possible to make the multicast streams travel from the first router MAG1 15 to the second router MAG2 16 for the time that the second router MAG2 16 resubscribes, in place of the terminal, to the desired multicasting group, and that thus the second router MAG2 16 joins the multicast multicasting tree for the multicasting group of this terminal.

Accordingly, the second router MAG2 16 asks the first router MAG1 15 to consult the subscription table Tab1 181 which is associated with it, and to transmit to it the information relating to the multicasting group(s) to which the terminal has subscribed in the first network.

Figure 3:
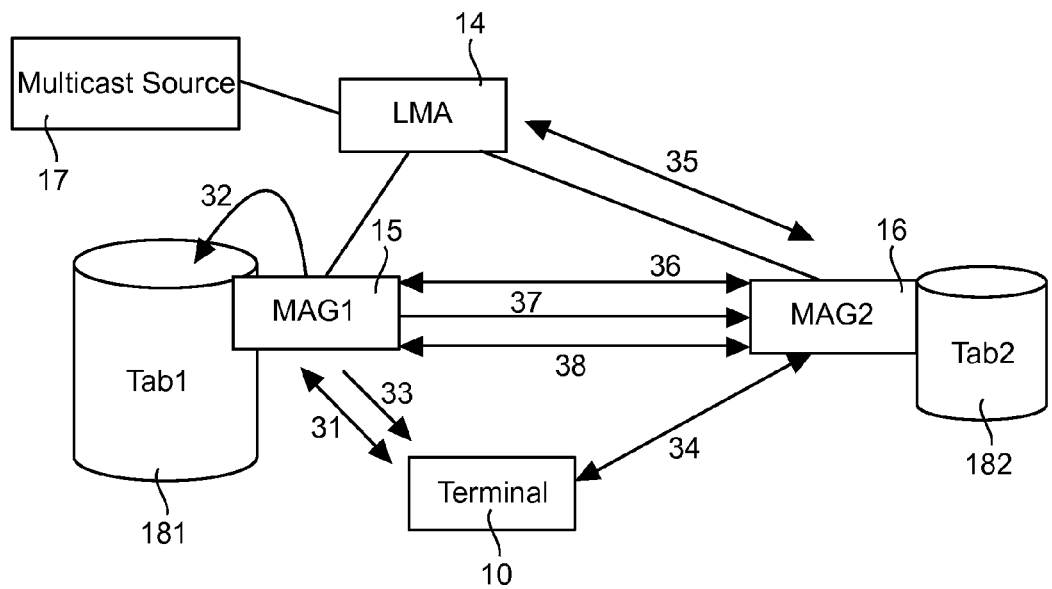
FIG. 3 illustrates a second embodiment of the invention in a system implementing a PMIP architecture.

The main steps implemented according to this second embodiment are more precisely described in conjunction with FIG. 3.

It is considered for example that the terminal 10 is connected to the first network by way of the first access rooter MAG1 15.

In the course of a step 31, the terminal 10 subscribes to a new multicasting group (multicast group), for example to the group "Orange Sports" (trademark).

In the course of a following step 32, the first access router MAG1 15, which receives the request for subscription to the group "Orange Sports" (trademark), updates its subscription table 181 for the terminal 10.

In the course of a following step 33, in accordance with the conventional multicast IP mechanisms, the first access router MAG1 15 joins the multicast multicasting tree for this group and transfers the corresponding multicast stream on the terminal's link.

In the course of a step 34, the terminal performs a mobility. Stated otherwise, it attaches to a new access point, termed the second router MAG2 16, in a conventional manner (conventional IP attachment). This new access point can make it possible to access a network of the same type as the first network (for example WLAN wireless local network) upon a change of location of the terminal 10.

In the course of a following step 35, the second router MAG2 16 notifies the LMA common router 14 of the attachment of the terminal to this router MAG2 (according to a conventional PMIP process), and asks the LMA common router 14 to transmit to it the former location of the terminal. The second router MAG2 16 thus learns that the terminal was previously connected to the first router MAG1 15, and recovers the address of this router MAG1.

In the course of a following step 36, the second router MAG2 16 interrogates the first router MAG1 15, of which it knows the address, to ascertain the multicasting group to which the terminal has subscribed. The first router MAG1 15 reads the subscription table Tab1 181 which is associated with it, and transmits this information to the second router MAG2 16.

The second router MAG2 16 then initiates the update of the multicast routing for these multicast streams. Stated otherwise, the second router MAG2 16 commences the subscription process to join the multicast multicasting tree.

For the time that the second router MAG2 16 joins the multicast multicasting tree, the first router MAG1 15 remains connected to the multicasting tree and transfers to the second router MAG2 16 the multicast streams requested by the terminal, in the course of a step 37.

When the second router MAG2 16 has finally joined the multicasting tree, the multicast routing is updated, in the course of a following step 38. The second access router MAG2 16 therefore asks the first router MAG1 15 to stop the transfer of data.

Stated otherwise, during the procedure of transfer from the first network to the second network, the second router MAG2 16 receives a football match multicast to the subscribers of the service "Orange Sports" (trademark) of the first router MAG1 15, as long as the second router MAG2 16 does not belong to the multicasting tree associated with this service. Once the subscription procedure for the second router MAG2 16 has been completed, that is to say once the second router MAG2 16 belongs to the multicasting tree associated with this service, the second router MAG2 16 asks the first router MAG1 15 to stop the transfer of the stream, and the stream no longer travels via the first router MAG1 15. The first router MAG1 15 can thereafter leave the multicasting tree or trees corresponding to multicasting group for which it no longer has any terminal in its network. For example, if none of the terminals present in the first network has subscribed to the service "Orange Sports", the first router MAG1 15 can de-register from the corresponding multicasting tree, once the second rooter MAG2 16 has joined this multicasting tree.

Again, in accordance with the PMIP specification, the terminal is not involved in the mobility management mechanism. Moreover, by virtue of the use of subscription tables, the multicast stream travels from the first router MAG1 15 to the second router MAG2 16, for the time that the second router MAG2 16 joins the multicasting tree, thereby making it possible to avoid the latency problems encountered according to the prior art techniques.

In particular, this second embodiment is beneficial especially when the number of terminals and/or of multicasting group is significant.

Indeed, rather than have a unique subscription table comprising the whole set of terminals and multicasting group associated with each of these terminals (which becomes voluminous when the number of terminals and/or of multicasting group is significant), one table per network is used, each table indicating the multicasting group to which a terminal has subscribed in the corresponding network.

Figure 4:
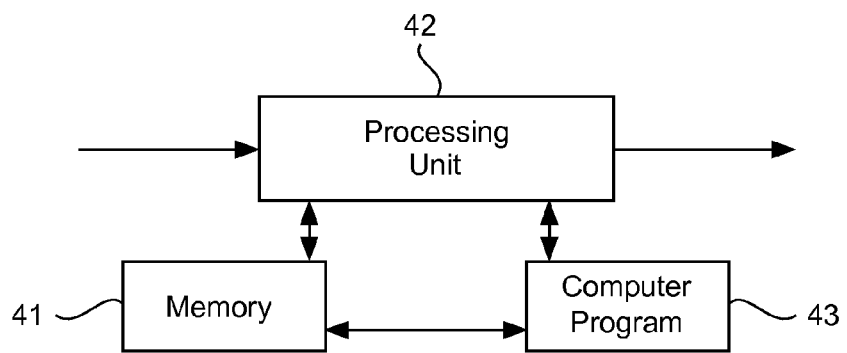
FIG. 4 presents an exemplary structure of an access router implementing a technique for managing a stream transfer according to one of the embodiments of the invention.

An exemplary simplified structure of an access router for a second network implementing a stream transfer management technique according to one of the embodiments described hereinabove is finally presented in conjunction with FIG. 4.

Such an access router, termed the second router, comprises a memory 41 comprising a buffer memory, a processing unit 42, equipped for example with a microprocessor μP, and operated by the computer program 43, implementing the method for managing a stream transfer according to the invention.

On initialization, the code instructions of the computer program 43 are for example loaded into a RAM memory before being executed by the processor of the processing unit 42. The processing unit 42 detects the attachment of a new terminal to the second router. The microprocessor of the processing unit 42 implements the steps of the management method described above, according to the instructions of the computer program 43, so as to transfer to this second network a data stream received by the terminal attached to a first network. For this purpose, the second router comprises, in addition to the buffer memory 41, means for detecting an arrival of the terminal in the second network, means for obtaining information relating to at least one multicasting group to which the terminal has subscribed and means for receiving the data stream on the basis of the information obtained, and for retransmission to the terminal. These means are operated by the microprocessor of the processing unit 42.

The invention claimed is:

1. A method for managing a transfer of a data stream received by a mobile terminal of a first network to a second network, said terminal having subscribed to at least one multicasting group receiving said data stream, and being connected to said first network by way of a first router, the first router being an access router for the first network, said method comprising:
    detecting, by a second router, an arrival of said terminal in said second network, said second router being an access router for the second network;
    obtaining, by said second router, information relating to at least one multicasting group to which said terminal has subscribed, based on said second router reading from a subscription table readable by the first router and by the second router;
    receiving said data stream by said second router, based on said information obtained; and
    retransmitting the data stream to said terminal.

2. The method of claim 1, further comprising a step of adding said second router to a multicasting tree for the multicasting group receiving said data stream, wherein said reception step is implemented as long as said second router does not belong to said multicasting tree.

3. The method of claim 1, wherein said subscription table indicates, for a terminal, all the multicasting groups to which said terminal has subscribed, and said reading is implemented by said second router.

4. The method of claim 3, wherein said second router sends a request to transmit said data stream destined for a router common to said first and second networks, and receives said data stream originating from said common router.

5. The method of claim 1, wherein said subscription table is associated with said first router and indicates, for a terminal connected to said first network, all of the multicasting group to which said terminal has subscribed, and said reading is implemented by said first router.

6. The method of claim 5, wherein said second router sends a request to transmit said data stream destined for said first router and receives said data stream originating from said first router.

7. The method of claim 5, wherein a subscription table is also associated with said second router, said subscription table indicating, for a terminal connected to said second network, all of the multicasting groups to which said terminal has subscribed.

8. The method of claim 1, wherein said subscription table is at least one of updated periodically and updated as a function of a modification of the subscriptions of said terminal.

9. A system for managing a transfer of a data stream received by a mobile terminal of a first network to a second network, said system comprising:
    a first router that is an access router for said first network;
    a second router that is an access router for said second network;
    said terminal having subscribed to at least one multicasting group receiving said data stream, and being connected to said first network by way of said first router,
    wherein said second router is configured to
        detect an arrival of said terminal in said second network;
        obtain information relating to at least one multicasting group to which said terminal has subscribed, based on said second router reading from a subscription table readable by the first router and by the second router;
        receive said data stream based on the information obtained; and
        retransmit said data stream to said terminal.

10. An access router for a second network, the access router comprising a memory having stored therein a computer program, and a processor that executes the computer program to:
    detect an arrival of terminal in said second network, the terminal having been subscribed to at least one multicasting group receiving a data stream on a first network;
    obtain information relating to at least one multicasting group to which said terminal has subscribed, on the basis of said second router reading from a subscription table readable by the first router and by the second router;
    receive said data stream on the basis of the information obtained; and
    retransmit the data stream to said terminal.

11. A non-transitory computer readable medium having stored thereon instructions for allowing a processor to carry out the method of claim 1.

\* \* \* \* \*